Patented Sept. 1, 1953

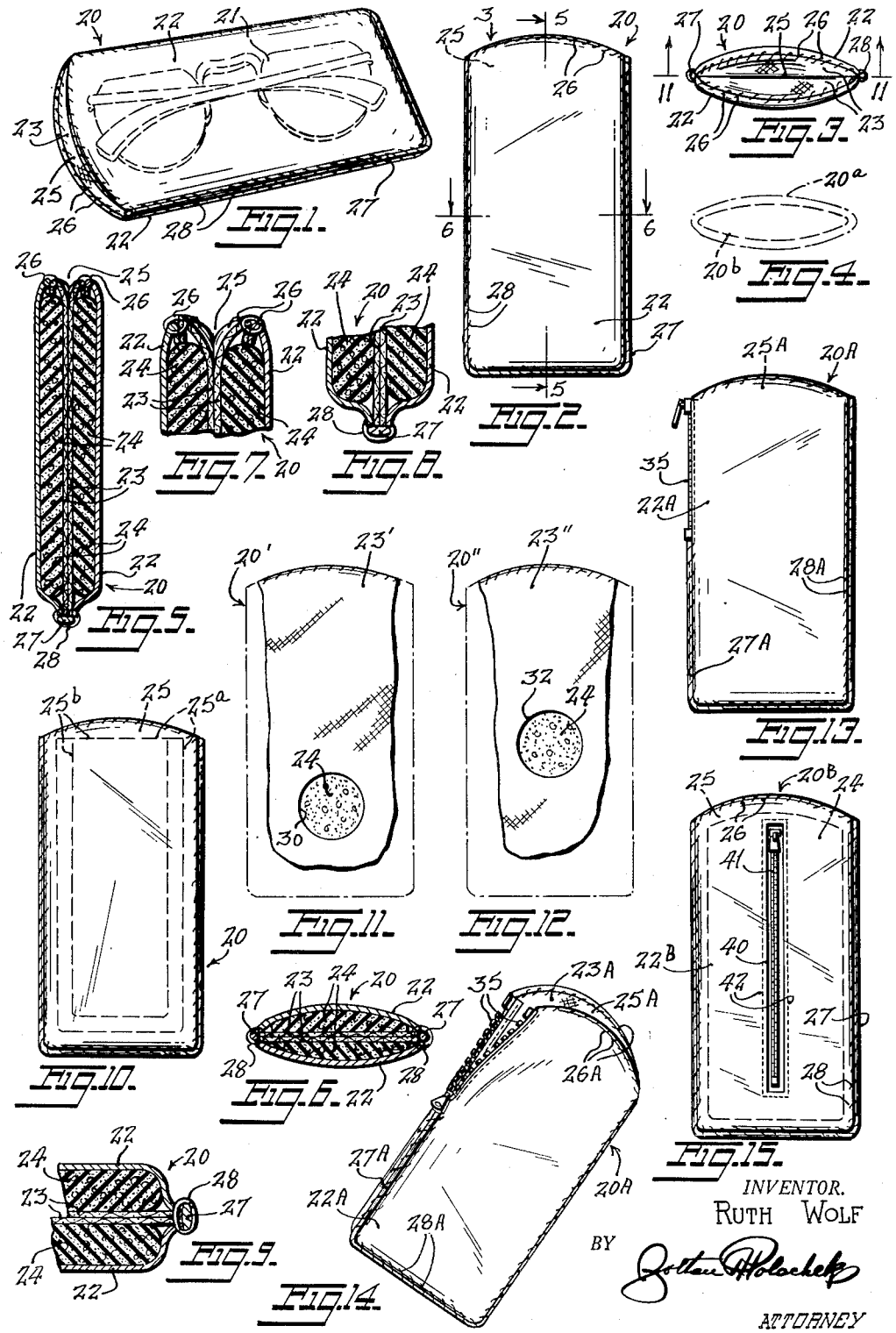

2,650,700

UNITED STATES PATENT OFFICE 2,650,700

CUSHIONED EYEGLASS CASE

Ruth Wolf, New York, N. Y.

Application November 29, 1950, Serial No. 198,159

1 Claim. (Cl. 206—5)

This invention relates to new and useful improvements in eyeglass cases; and, more particularly, the aim is to provide a novel and valuable eyeglass case of the kind wherein a cushioning means is incorporated in the case for protecting eyeglasses therein against lens breakage and other damage.

An object of the invention is to provide an eyeglass case, as one for being carried in the pocket and for containing a pair of eyeglasses between uses thereof, so constituted that the eyeglasses therein, whether of the spectacles or pince-nez type, are gently yet securely gripped by and between opposite walls of the cases in an improved way; and a feature of the invention, in attaining the object just-stated, is that the new eyeglass case is so constructed that in each of said walls there is a cushioning layer, such as one of sponge or foam rubber, and, at the same time, said walls, in remaining part, are comprised of highly pliant and flexible sheet members, instead of the stiff and rigid sheet members characteristically included in the well-known type of eyeglass case the primary structure of which is a shallow box having a hingedly attached cover.

A further feature of the invention, this in part at least resulting from the first-named feature, is that the thickness of the new eyeglass case readily varies, to automatically, as it were, adapt itself to the optimum for various conditions; that is, the case is readily temporarily lightly elastically compressible, incidental to its insertion in such a pocket as that, say, of a man's vest, to insure a desirable lack of bulk in the pocket, yet, immediately on removing the case from the pocket, the normal rather great thickness of the case returns thereby to re-establish the said cushioning elements at the thickness they should have in order to protect the eyeglasses against injury should the case while containing the eyeglasses be dropped.

Another feature of the invention is the inclusion in the case walls, at the exteriors thereof, of pliant and flexible sheet members having non-smooth-surfaced outer sides; whereby said last-named sheet members, desirably of suede leather, constitute frictional instrumentalities for coacting with a pocket lining or the like to combat accidental slipping of the case out of the pocket.

Still another feature of the invention is a structure for the new eyeglass case such that, while the case may be practically lined with a sheet member of such flexibility and nature that contact of an eyeglass lens therewith and sliding of said lens thereover act rather to clean and polish the lens than otherwise, nevertheless the cushioning layers may be so present that a direct engagement will always be set up between at least one of said layers and the eyeglasses in the case, with this engagement of a kind to combat accidental slipping of the eyeglasses out of the case.

Another feature of the invention which also it has been found to be most desirable to include, is a variation in area as between the cushioning layer of one wall and the cushioning layer of the other wall; with this area variation accompanied as well by a thickness variation and also a nature-of-material variation. These variations permit retention of full protective action by the case, while facilitating ease of fabrication of the case. Said variations, as shown in the drawing and below described in detail, will hereinafter be referred to as the cushion variations.

Yet another feature of the invention is a quick-operable means which normally establishes the new eyeglass case as a properly fully closed case of the scabbard type, yet which is actuable to effect temporary transformation of the case into a highly convenient and exceptionally efficient lens cleaner and polisher.

Still further, the present invention proposes constructing one of the side walls of the eyeglass case with a readily openable opening providing access to the space between the outer layer and the resilient lining of that side wall in a manner so that eyeglass cleaning tissues or similar cleaning articles can be stored in that space.

It is a further object of the present invention to construct eyeglass cases of the type described which are simple and durable and which can be manufactured and sold at a reasonable cost.

For further comprehension of the invension, and of the objects and advantages thereof, reference will be had to the following description and accompanying drawings, and to the appended claim in which the various novel features of the invention are more particularly set forth.

In the accompanying drawings forming a material part of this disclosure:

Fig. 1 shows in perspective a now favored embodiment of the new eyeglass case; with a pair of spectacles indicated as contained in the case.

Fig. 2 is a side elevation of said case.

Fig. 3 is a top plan view thereof; that is, a view looking in the direction of the arrow 3 in Fig. 2, or down at the open end of the case.

Fig. 4 is rather a diagrammatic view, with here the dot and dash lines indicating the thick- 2,650,700

3 ness of the case when unconfined, and the broken lines indicating the thickness of the case when confined, even with a pair of eyeglasses therein, as a pocket.

Fig. 5 is a longitudinal section, taken on the line 5—5 of Fig. 2.

Fig. 6 is a transverse section, taken on the line 6—6 of Fig. 2.

Fig. 7 is an enlarged detail view for clearly showing certain parts indicated at the top of Fig. 5.

Fig. 8 is a similar view, relative to parts indicated at the bottom of Fig. 5.

Fig. 9 is also a similar view, but relative to parts indicated at the right hand side of Fig. 6.

Fig. 10 is a view similar to Fig. 2, and particularly to illustrate certain possible ones of the aforesaid cushion variations; the illustration being here, in broken lines, of area variations as between a cushioning layer at one side of the case and a cushioning layer at the opposite side of the case.

Fig. 11 is illustrative of an internal construction which may be employed; this view being as though a fragmentary longitudinal sectional one, taken on the line 11—11 of Fig. 3 (looking either in the direction of the arrow there indicated, or in the opposite direction).

Fig. 12 is a view similar to Fig. 11, illustrative of a modification in said internal construction.

Fig. 13, a view similar to Fig. 2, shows a modification of the embodiment of one of the outer structural elements of the new eyeglass case as shown in Figs. 1–3.

Fig. 14 is a perspective view, showing the case of Fig. 13 partially opened up along one of its sides, for temporary transformation of the case into a convenient and efficient lens cleaner and polisher as aforesaid.

Fig. 15 is still another view similar to Fig. 2, but illustrating the eyeglass case constructed in accordance with still another modification of the present invention.

Referring now to the drawing more in detail, and first to Figs. 1 through 9, the eyeglass case here shown, the same as a whole being designated 20, is of the scabbard type, that is, permanently open at one end, through which opening a pair of eyeglasses, as the spectacles indicated at 21 in Fig. 1, may be inserted for endwise advancement into and confinement within the interior of the case.

The case 20 comprises a pair of opposite walls, both of the same outline, and each comprising an outer or covering sheet element 22, this desirably a fairly thin and highly pliant and flexible suede leather having its suede-finished side outermost; an inner or lining sheet element 23, this desirably of cotton flannel, flannelette, or cotton felt; and, sandwiched in between the sheet elements 22 and 23, a cushioning layer 24 of foam or sponge rubber or the like.

With the case 20 when finally completed to have its permanently open mouth 25 as indicated at the left in Fig. 1, at the right in Figs. 2, 5 and 7, and facing the observer in Fig. 3, the sheet elements 22 and 23 of each wall may be first stitched together as indicated at 26 across the end of the wall to be at said mouth; this stitching at 26, 26 conveniently being an overhand switch as shown most clearly in Fig. 7, and passing through not only the main bodies of said sheet elements but also through inturned edge portions of the latter.

Then, with one of the cushioning layers 24 in

4 between the sheet elements 22 and 23 of each wall, the edges of all four of the sheet elements 22 and 23 in the two walls, all around the two sides and the bottom of said walls, are arranged in registry, a band or tape 27 is applied in U-extension along said registered edges, and an overhand stitching 28 is applied as shown all along the length of said band or tape, with each loop of this stitch passing around said band or tape and through the two sheet elements 22 and the two sheet elements 23 of both walls. Thereby the fabrication of the case 20 is completed.

The cushioning layers 24, one in each of the two wall structures componental of the case 20 as above explained, may be retained in particular locations as predetermined each in the case of one of the walls within the envelope established at that wall by the sheet elements 22 and 23 of the latter, in any suitable way, as by one or more dabs of a suitable adhesive, if desired.

As already stated, in the brief description of Fig. 4, this view graphically indicates variations in thickness of the case 20 occurring under different conditions; so that, if the thickness of the case be, for example, taken as that indicated at $20^a$ in dot and dash lines, when the case is not confined as in a pocket, the case thickness may be, for example, taken as that indicated at $20^b$ in broken lines, when the case, with a pair of eyeglasses therein, is confined in a pocket. As will be understood, and indeed as just stated, these thickness variations are given merely by way of example; and as will further be understood, the thicknesses of the sheet elements 22 and 23, as shown in Figs. 5 and 6 particularly, are exaggerated. Dimensions, however, are not important, except as next will be mentioned in connection with a consideration of Fig. 10, now to follow.

Referring more particularly to Fig. 10 and to the aforesaid cushion variations, those which are now believed to be highly desirable if not essential in obtaining all the advantages of the present invention, include, as to the two cushioning layers $25^a$ and $25^b$ one in one wall and the other in the opposite wall, the making of one such layer larger than the other both in length and width, with both, however, rectangular in outline, to minimize waste of rubber material.

Thus, were one such cushioning layer to be given a length and width corresponding to that indicated at $25^a$ in broken lines in Fig. 10, the other could well be given a length and width corresponding to that indicated at $25^b$ in broken lines in Fig. 10.

With the case 20 say of a size properly to take and fully protect an adult's pair of spectacles, that is, with the case of length of about 5¾″ and a width of about 2¾″, and with the length of the cushioning layer $25^a$ about 5½″ and its width about 2½″, the length of the cushioning layer $25^b$ very desirably would be 5⅜″ and its width 2¼″; in other words, with the upper ends of said layers $25^a$ and $25^b$ aligned as in Fig. 10, one of the layers, as the layer $25^b$, would, all along its two sides and across its bottom, be spaced just about twice as far from the two sides and from the bottom of the case 20, as the other layer $25^a$ would be thus spaced.

Ideal results have been obtained when the two layers $25^a$ and $25^b$ are of different areas and relatively arranged as in Fig. 10, and when also, one of said layers is of foam rubber, the other is of sponge rubber, and the one of foam rubber is of about half the uncompressed thickness of the one of sponge rubber. Also, with the two layers 25ª and 25ᵇ of different areas and relatively arranged as in Fig. 10, the thicker one of said two layers has had an uncompressed thickness merely of ¼", yet the two objectives aimed at have both been attained. One, of course, is to obtain full cushion protection for the eyeglasses in the case, no matter at what angle the case when dropped strikes such an unyielding surface as a stone pavement; and it has been found that because the case of the present invention has no hard and unyielding walls to act as shock transmitters to a fragile part of the eyeglasses, cushioning layers 25ª and 25ᵇ of the relative degree of thinness indicated above do give perfect protection.

Another of said two objectives aimed at is to make it practicable to couple the two walls of the case along the two sides and along the bottom of the latter, by means of the band, tape or cord 27 and a single line of stitching 28 the loops of which go around the element 27 at the exterior of the meeting edges of the two sheet elements 22 and of the two sheet elements 23 and which also go through all four of said sheet elements. With both the cushioning layers 25ª and 25ᵇ of less length and also of less width than the case 20, and with, further one of said layers of less length and of less width than the other, all to the extents typified by the description given above of dimensional relations between the case 20 and the elements 25ª and 25ᵇ of Fig. 10, the coupling of the two walls of the case by means of such an element as the band or tape 27 and such a stitching as the stitching 28 is made easy and convenient.

In Figs. 11 and 12, there is shown the same case as illustrated in and described in connection with Figs. 1–10; but said case is designated 20' in Fig. 11 and 20" in Fig. 12 for the reason that the lining sheet element for each of the two walls of the case 20' or 20" is apertured whereas the corresponding elements 23 of the case 20 are not apertured.

The case 20', as indicated in regard to that one of its two identical lining sheet elements shown in Fig. 11 and there marked 23', is inclusive of an aperture 30 through each of said sheet elements; each of these apertures being at a location such that a portion of the adjacent surface of the underlying cushioning layer 24 may enter into frictional engagement with a face of a lens of the eyeglasses inserted into the case, thereby to combat accidental slipping of the eyeglasses out of the case.

The case 20" as indicated in regard to that one of its two identical lining sheet elements shown in Fig. 12 and there marked 23", is also inclusive of an aperture through each of said sheet elements; but each of these apertures, the one seen in Fig. 12 being designated 32, is at a location such that the detentive engagement between a cushioning layer 24 and the eyeglasses will be at the nosepiece and nose-pads of the eyeglasses.

Referring to Figs. 13 and 14, there is illustrated a variation of the case 20, 20' or 20", which is designated 20A. There is but a single structural variation as between the case 20, 20' or 20", and the case 20A yet an important new utility is added to the case when including that structural variation.

The latter, in regard merely to one of the outer structural elements of the case, consists in substituting, for a part of the length of the band, tape or cord 27, a band, tape or cord 27A exactly like and of the same length as the major length of the element 27; and in adding a slide fastener 35 of a length such that said length when added to the length of the element 27A is equal to the length of the element 27. With the slide fastener placed as shown in Figs. 13 and 14, and with its two teeth-carrying tapes stitched one to one of the walls of the case and the other to the other of said walls in a way to attach to each other and to said tape the covering sheet element 22A and the lining sheet element 23A of that wall, and with the band, tape or cord 27A secured in place by a stitching 28A corresponding to the stitching 28, in all other respects the case 20A is exactly like the case 20, 20' or 20"; having its permanently open mouth at 25A, and at each of its two walls adjacent to said mouth the sheet elements 22A and 23A being secured together by a stitching 26A corresponding to the stitching 26.

The maintenance of an eyeglass lens in fully cleaned and highly polished condition is important, if the sight particularly and the health generally, are to receive due protection. Special liquid sprays have been proposed, and are used by opticians. But the average wearer of eyeglasses will not trouble to have such sprays at hand. Chemically treated papers have also been proposed; but these have not been looked on with favor in all quarters, because difficult to handle without chance of accidental smearing of the lens with skin oil from finger or some other portion of the hand. Special cloths have also been loosely folded and placed by some opticians in eyeglass cases of the aforesaid kind incorporating a stiff shallow box having a hingedly attached cover; but these cloths also have in time absorbed skin oil and thereupon become worse than useless.

In view of all these considerations, it has somewhat above been said that the single structural variation indicated in Figs. 13 and 14 has added an important new utility to the case. This utility is the use of the case when desired as a cleaning and polishing implement for a lens of a pair of eyeglasses. The cleaning and polishing agents are the mutually facing sides of the lining sheet elements 23A, 23A; they need never be contacted by the human hand; and they are normally protected from accumulating dust, as normally the slide fastener 35 is closed as in Fig. 13. However, whenever it is desired to transform the case into a cleaning implement, all that is required is to open the fastener 35 as in Fig. 14.

In Fig. 15, there is illustrated an eyeglass case 20ᴮ similar in construction to the case shown in Fig. 1 to 9. The case 20ᴮ of the present modification differs from that of the first form of the invention in that the outer sheet element 22ᴮ is formed intermediate of its ends with a longitudinally extending slot 40 providing access to the space between the adjacent faces of that sheet element 22ᴮ and the contained cushioning layer 24. The slot 40 is closed by the usual slide fastener 41 which has its longitudinally extending tapes secured to the material of the sheet element 22ᴮ on opposite sides of the slot 40 by stitches 42. When the slide fastener 41 is opened one's fingers can be inserted into the space between the adjacent faces of the sheet element 22ᴮ and the cushioning layer 24 for removing one of the contained lens cleaning tissues (not shown) which can be stored in that space.

In other respects the form of the invention shown in Fig. 15 is the same as that illustrated in Figs. 1 to 9 and like reference numerals are used throughout to identify like parts.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

An eyeglass case in the form of a scabbard-like structure having a permanently open mouth at one end, said structure comprising a pair of oppositely located walls each having interiorly thereof a cushioning layer of a material having a resiliency of the order of that of sponge or foam rubber, each of said walls having an outer covering for said cushioning layer consisting of a thin highly pliant and flexible sheet member and an inner covering or liner consisting also of a highly pliant and flexible sheet member, the inner face of said lining sheet member having a flannel-like nap, said scabbard-like structure being permanently closed all around one side and the bottom and a part of the other side thereof adjacent to the bottom, and there being an openable closure in the form of a slide fastener for the remaining part of the last-named side of said structure, whereby that side of said structure may be readily temporarily opened up to transform the case into an eyeglass-lens cleaning implement.

RUTH WOLF.

References Cited in the file of this patent

UNITED STATES PATENTS

| Number | Name | Date |
| --- | --- | --- |
| 1,834,419 | Pratt | Dec. 1, 1931 |
| 1,942,917 | D'Este et al. | Jan. 9, 1934 |
| 2,282,908 | Thompson | May 12, 1942 |